Aug. 29, 1967  J. C. SNYDER  3,338,966
MANUFACTURE OF p-NITROSOANILINE
Filed April 1, 1964
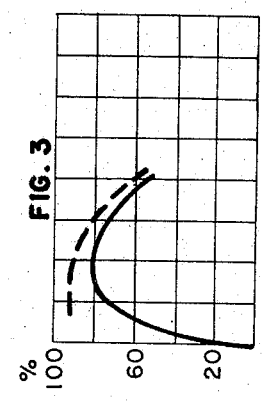
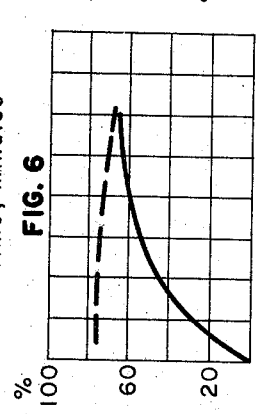
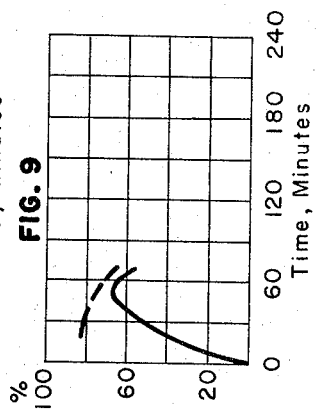
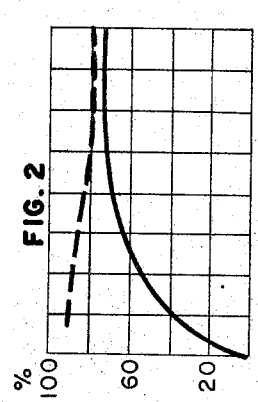
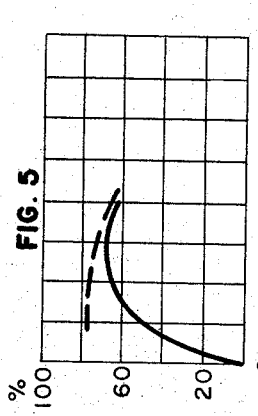
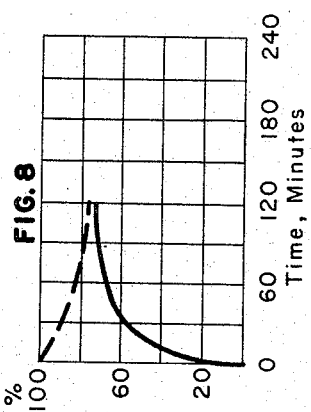
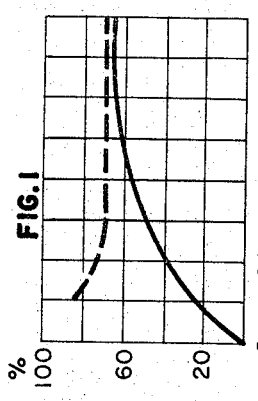
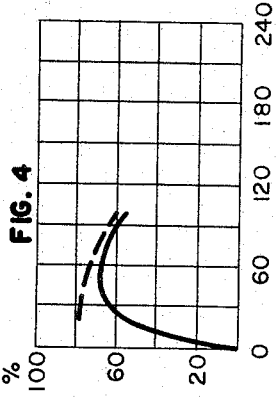
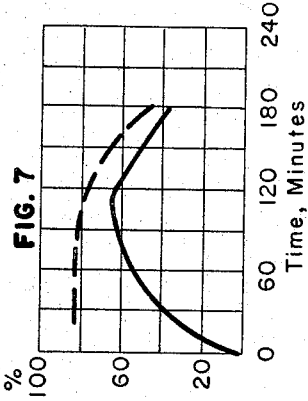
——— CONVERSION
— — YIELD
JOHN C. SNYDER
INVENTOR.
BY Ernest G. Peterson

United States Patent Office 3,338,966
Patented Aug. 29, 1967

3,338,966
MANUFACTURE OF p-NITROSOANILINE
John C. Snyder, Darling, Pa., assignor to Hercules Incorporated, a corporation of Delaware
Filed Apr. 1, 1964, Ser. No. 356,454
18 Claims. (Cl. 260—581)

Ths invention relates to the manufacture of p-nitrosoaniline by a two-stage process involving direct reaction of p-nitrosophenol with ammonia to form the corresponding salt and conversion of the salt, so produced, to the aniline.

p-Nitrosophenol and a primary phenyl or primary aliphatic amine, as reactants in an amination process for the manufacture of p-nitrosophenylamines, are disclosed and claimed in U.S. Patent 3,107,264, granted Oct. 15, 1963, to Hays and Young and assigned to Hercules Powder Company. To accomplish the amination at appreciable conversion and yield levels, it must be carried out indirectly by first reacting the p-nitrosophenol with an alcohol to form the corresponding p-nitrosophenyl ether and then separating the ether, so produced, and reacting it with the amine, in the presence of an acid as a catalyst.

As has been reported by Fischer and Hepp, Ber. 20, 2474 (1887), p-nitrosophenol has been converted to p-nitrosoaniline by reaction with certain dry ammonium salts. However, yields at any given set of conditions employed in carrying out the reaction are variable with formation of large amounts of unidentified tarry by-product materials. It is seldom that product yield exceeds 25 to 35 percent. In all events, conversion and yield are of no significance from a practical point of view.

p-Nitroaniline has been prepared in accordance with process involving direct reaction of p-nitrophenol with ammonia at temperatures in the order of 150 to 160° C. and higher. The thermal stability of p-nitrosophenol is so markedly less than that of the p-nitrophenol that under such elevated temperature conditions as utilized in the ammonolysis of p-nitrophenol, it thermally decomposes with no appreciable conversion to the aniline.

This invention is concerned with a process utilizing p-nitrosophenol as a direct reactant with ammonia in the manufacture of p-nitrosoaniline without significant degradation of the p-nitrosophenol, and at high conversion and yield levels.

In accordance with the invention, a process is provided for the manufacture of p-nitrosoaniline which comprises, in a first stage, introducing ammonia and p-nitrosophenol into contact for a period of at least one minute to form a resulting admixture containing ammonia in a mole ratio to p-nitrosophenol in excess of 1:1, at a temperature above the melting point of ammonia therein and regulated, as described hereinafter, so as to not exceed 70° C., and maintaining ammonia in said admixture in liquid phase during at least a period of said contacting up to and including termination of same, whereby said ammonia and said p-nitrosophenol react exothermically to form ammonium p-nitrosophenolate dissolved in said liquid ammonia phase; introducing at least one of said ammonia and p-nitrosophenol into the above said admixture at a predetermined low rate to permit dissipation of heat from the resulting exothermic reaction to regulate the temperature of same as described; in a second stage, heating resulting ammonia phase, in its liquid state, at a temperature within the range of from 90° to 125° C. for at least 0.25 hr., whereby p-nitrosophenolate in said liquid ammonia phase reacts to form p-nitrosoaniline; and recovering p-nitrosoaniline, so produced, as product of the process.

I have found that in carrying out the second stage of the process of this invention, higher conversion and yield can be accomplished under shorter time conditions when certain salts, particularly ammonium chloride, calcium chloride, ferric chloride, ammonium acetate, ammonium formate, ammonium p-toluene sulfonate and aluminum chloride, are present. These salts can be added to the liquid ammonia phase just prior to further reaction of same to convert the ammonium p-nitrosophenolate to the corresponding aniline. However, they are also advantageously present during the reaction of the first process stage, particularly inasmuch as they affect density of the liquid ammonia phase, which, in one embodiment, facilitates recovery, or separation, of an ammonia phase for subsequent treatment. The salts, when utilized, are generally added during, or at the beginning of, the first stage. However, they can be advantageously added at the beginning of the second stage. The amount of salt added, in any event, is generally in a mole ratio to the total nitrosophenol added of from about .01:1 to 10:1.

I have found it advantageous to employ a solvent, chemically inert under the reaction conditions of each of the first and second process stages of the invention, even though at all times, the above described stoichiometric excess of ammonia is maintained. Exemplary solvents are lower alkyl esters, lower alkyl ethers and lower alkyl nitriles, as for example, ethyl acetate, propyl acetate, diethyl ether, methyl nitrile, isopropyl nitrile, n-butyl nitrile, isobutyl acetate and the like.

When utilizing a solvent, in the practice of the first process stage, temperature control is somewhat simplified as result of the dilution effect and accompanying increase in absorption of exothermic heat. In the second process stage, dilution provided by the use of a solvent also facilitates temperature control, and in certain instances, particularly in the case of the nitrile solvents, there is reaction between the solvent and water formed, which shifts the reaction equilibrium toward p-nitrosoaniline, with accompanying increases in conversion and yield.

Any suitable temperature below about 50° C., and in all events, not exceeding 70° C., can be employed in carrying out the first process stage of the invention. Preferred temperatures are from about 0 to 50° C., more generally 0 to 35° C., when carrying out the first stage reaction in absence of a supplementary solvent. However, in the presence of a supplementary solvent, the preferred range is more often from 15° to 35° C. Minimum pressure for the first stage reaction is that which is sufficiently high, at least during the final stages of contacting, to maintain the ammonia therein in liquid phase. A pressure of about 10 atmospheres or higher is illustrative of pressure conditions contemplated. The rate of contact of the reactants is to a large extent, determined by the particular modus operandi employed in forming the first stage reaction mixture, but it is generally in the range of say, 2–50 equivalents of ammonia per equivalent of p-nitrosophenol per hour. Minimum reaction time during the first stage of the process is dependent on the modus operandi employed. However, it is generally of short duration, say at least one minute and generally not more than about 5 minutes. However, extended residence time, with substantially no adverse effects, is not unusual in batch operation in which the rate of addition of the reactants is necessarily prolonged over such periods.

The final first stage mixture containing liquid ammonia in stoichiometric excess generally contains liquid ammonia in a molar ratio to the total p-nitrosophenol added to the admixture in the range of at least 2:1 and preferably from about 20:1 up to about 200:1 or higher, in the absence of a supplemental solvent; and the in range of at least 2:1 and preferably about 10:1 up to about 50:1 or higher when a supplemental solvent is employed. The liquid ammonia in stoichiometric excess serves as a suitable solvent alone or in conjunction with any supplemental solvent for the ammonium p-nitrosophenolate product, and it also serves to shift the equilibrium in favor of formation of the ammonium salt.

The amount of supplemental solvent, when utilized in the first stage reaction, is generally present in a mole ratio to the p-nitrosophenol reactant added thereto, sufficiently high to provide a resulting liquid ammonia-supplemental solvent containing ammonium p-nitrosophenolate product in a concentration in the order of from 0.05 to 1.0 molar, preferably 0.1 to 0.5 molar.

The second stage reaction is carried out at a temperature within a critical range of from 90 to 125° C. At temperatures above 125° C., the stability of the ammonium p-nitrosophenolate is markedly impaired at the expense of low conversion and yield. At temperatures below 90° C., the rate of the second stage reaction is so low as to be of no practical significance. Preferably, the second stage reaction is carried out at a temperature in the range of from about 105 to 120° C. Time of the second stage reaction is at least 0.25 hr., extending in some instances up to 10 hrs. and longer, although it is generally not longer than from 5 to 6 hrs., a preferred range being from about 0.5 to 4.0 hrs. Any suitable pressure can be utilized in the second stage reaction which is sufficient to maintain the reaction mixture in liquid phase, a pressure in the order of from 50 to 90 atmospheres being often advantageously employed.

The reaction involved in the second stage of the process of the invention is essentially that of dehydration of the ammonium p-nitrosophenolate and as mentioned above, appears to be an equilibrium type reaction so that removal of water product results in a shift of equilibrium to the aniline side.

The amount of ammonia present in the second stage is generally that stoichiometric excess from the first stage, i.e., which is in a mole ratio to the total p-nitrosophenol added to the first stage, of at least 2:1 and preferably 20:1 and higher when no supplemental solvent is utilized in the first stage, and preferably at least a molar ratio of 10:1 when a supplemental solvent is so utilized. However, ammonia in excess of these amounts can be utilized, and I have found that this is of particular importance in the absence of a supplemental solvent, in which event, the stoichiometric excess is often advantageously in the range of 50:1 to 300:1. Excess ammonia at such high content generally results in somewhat increased conversion and yield, which may be attributable to reaction of the ammonia under these conditions with water formed during the second stage reaction to cause the equilibrium shift above described. Further, when the above said minimum stoichiometric excess of ammonia is not maintained throughout both stages of the process, I have found, particularly in the second stage, that the ammonium p-nitrosophenolate undergoes reversible decomposition to the free p-nitrosophenol which then undergoes pyrolytic and exothermic decomposition with accompanying loss in conversion and yield.

When a supplemental solvent is utilized in the second stage reaction, it is generally present in an amount such that the concentration of the ammonium p-nitrosophenolate and p-nitrosoaniline product in the resulting liquid ammonia-supplemental solvent solution is from about 0.5 to 1.0 molar, often from about 0.1 to 0.5 molar. This amount of supplemental solvent, when one is utilized, is employed in the second stage independently of whether it is added to the first stage reaction.

In bringing the ammonia and p-nitrosophenol into contact to form the ammonium p-nitrosophenolate in accordance with the reaction of the first process stage, any suitable modus operandi can be utilized so long as the requisite temperature control is maintained. Thus, gaseous ammonia can be brought into initial contact with solid p-nitrosophenol, with agitation, at such a gas flow rate as to permit dissipation of the exothermically liberated heat of reaction to maintain the resulting reaction mixture at a temperature below the 70° C. maximum and preferably below 50° C. In accordance wih another embodiment, solid p-nitrosophenol can be very slowly fed into a predetermined volume of liquid ammonia, with agitation, again the contact of these two reactants being at a predetermined low rate as to permit dissipation of the liberated heat as above described. In still another embodiment, liquid ammonia can be added to a given mass of solid p-nitrosophenol with agitation at such a low addition rate as to maintain the requisite temperature conditions. A now preferred modus operandi for carrying out the first stage reaction is that of first slurrying the p-nitrosophenol in a suitable inert liquid in which the ammonium p-nitrosophenolate to be formed is also of low solubility, a liquid hydrocarbon such as a butane, pentane, hexane, gasoline fraction, gas-oil fraction or the like, being generally most advantageously utilized. Aliphatic ethers can also be utilized as carriers in the formulation of the above slurries. However, ammonium p-nitrosophenolate is of somewhat higher solubility in these ethers so that there is some loss incurred to the ether phase.

In the practice of a now preferred embodiment of the two-stage process of the invention, p-nitrosophenol is admixed with a saturated liquid hydrocarbon, such as a butane, pentane, hexane, or mixtures thereof to form a hydrocarbon slurry of the solid p-nitrosophenol in which the volume, on a dry basis, of p-nitrosophenol component is in a ratio to the volume of liquid hydrocarbon carrier in the range of from about 1:1 to 10:1. The slurry is then charged to a preferably dry, air-free and closed reactor and ammonia is added in gaseous state with agitation at the requisite predetermined low rate, for example, from about 2 to 16 moles per hour per mole of the p-nitrosophenol initially present. However, the controlling factor is the temperature developed as result of the contact of gaseous ammonia with the p-nitrosophenol in the slurry. After addition of about the first equivalent of gaseous ammonia, a bottom liquid ammonia phase, containing the ammonium salt of the p-nitrosophenol, i.e., ammonium p-nitrosophenolate, begins to form.

After the addition of about the first equivalent of gaseous ammonia to the reactor as described, either gaseous or liquid ammonia can be added, and at a somewhat increased rate, inasmuch as neutralization of a substantial proportion of the p-nitrosophenol has been completed and subsequently developed heat of neutralization can be more quickly dissipated into the liquid phase. The resulting bottom layer, namely, the concentrated liquid ammonia phase containing the ammonium p-nitrosophenolate, is then separated from the hydrocarbon layer to serve as reactant phase for the second stage reaction.

The resulting liquid ammonia phase is separated from the hydrocarbon phase after a few minutes time for settling and, after addition thereto of an additional ammonia that is required for the second phase, as described above, is then heated at a temperature in the order of 105° to 120° C. for a period of from about ½ to 2½ hrs., under which conditions, water is split off from the ammonium p-nitrosophenolate to form the corresponding p-nitrosoaniline. At the end of this period, the unreacted ammonia is separated from the reaction mixture by distillation to provide residual p-nitrosoaniline in yield often in the order of 85 to 95 percent. Alternatively, the p-nitrosoaniline product can be recovered by extraction with isopropyl ether, ethyl acetate or the like.

The invention is illustrated with reference to the following examples.

*Example 1*

15 grams of dry commercial grade p-nitrosophenol was charged to a 130 ml. electrically heated reactor, initially at ambient room temperature but being gradually heated to provide an average temperature rise of about 5.4° C.

per minute. The temperature, upon reaching 69° C., "ran away," i.e., it rose rapidly, and within a 1.5 minute period, increased to 305° C., the latter at a reactor pressure of 775 p.s.i.g. Upon opening the reactor, it was found that the p-nitrosophenol had become a charred mass.

This example clearly demonstrates thermal instability of p-nitrosophenol at temperatures in the order of 70° C. and the need for control of temperature conditions to substantially prevent p-nitrosophenol decomposition.

*Example 2*

The 130 ml. reactor of Example 1 was charged with 12.3 grams of solid, dry p-nitrosophenol of 99+ percent purity and then evacuated. 50 cc.'s of liquid ammonia was then rapidly distilled into the evacuated p-nitrosophenol-containing reactor, the latter being immersed in an ice-water bath at internal temperatures in the order of from 5–10° C. Immediate reaction occurred with a quick temperature rise up to about 125° C. The p-nitrosophenol originally charged was found to have been decomposed to a char.

This example further demonstrates the thermal instability of p-nitrosophenol, and the importance of the procedure of this invention for first forming the ammonium p-nitrosophenolate.

*Example 3*

12.3 grams of solid p-nitrosophenol (100 mmoles) was charged to the 130 ml. reactor of Example 1 maintained in an ice-water bath, and the reactor evacuated. 300 mmoles of gaseous ammonia was then charged to the reactor in contact therein with the p-nitrosophenol at an initial temperature in the order of about 5–10° C. over a period of 25–30 minutes. At the end of this period, 60 ml. of liquid ammonia, as measured at room temperature, was added to the resulting reaction mixture in about 10 minutes, the final pressure in the reactor being 130 p.s.i.g. The ammonia was then vented from the reactor. Residual product was the ammonium salt of p-nitrosophenol, i.e., $NH_4OC_6H_4NO$, in a yield of about 95 percent.

This example demonstrates the formation of the ammonium salt in liquid ammonia solution by the slow and controlled introduction, initially, of gaseous ammonia into contact with the p-nitrosophenol.

*Example 4*

A 500 ml. reactor equipped with stirrer was charged with 24.3 grams (200 mmoles) of dry p-nitrosophenol of 99+ percent purity. 125 cc.'s dry n-hexane was added to the p-nitrosophenol with agitation to form a slurry. 1 mole of gaseous ammonia was gradually added to the slurry with stirring over a 20-minute period with a temperature rise of less than 5° C., followed by addition of 150 ml. of liquid ammonia. The resulting slurry was then transferred to a 1 liter vessel and after 10 minutes, 50 cc.'s of liquid ammonia was vented therefrom. The residual product in the vessel was liquid to two phases, viz., a bottom ammonia layer containing the ammonium salt of p-nitrosophenol in a yield of about 96 percent, and an upper n-hexane layer. The n-hexane phase was substantially clear and devoid of ammonium salt product.

This example demonstrates another embodiment of the invention, namely, the slurry route, in accordance with which the p-nitrosophenol is first converted to its ammonium salt to provide a liquid ammonia reactant phase for conversion of the salt to the aniline.

*Example 5*

The process of Example 4 was repeated except that there was no ammonia vented from the liquid in the 1 liter vessel but instead, 150 ml. of additional liquid ammonia was added. In this case, the total product was a two-phase liquid, the clear n-hexane phase being the higher density and bottom phase, and the liquid phase containing the ammonium salt of p-nitrosophenol being the lighter and top phase.

This example again demonstrates the slurry technique involved in the preparation of the ammonium salt of the p-nitrosophenol, in this instance forming the ammonium salt phase as the low density layer.

*Example 6*

A series of runs involving reaction of gaseous ammonia with p-nitrosophenol to form the corresponding ammonium salt and conversion of the latter to p-nitrosoaniline was carried out under varied conditions, all as indicated in the following tabulation.

TABLE I

| Run No. | Charge | | | | | Reactor Vol., ml. | Ammonia a Liquid | | Second Stage Conditions | | | |
|---|---|---|---|---|---|---|---|---|---|---|---|---|
| | p-Nitrosophenol, mmoles | Ammonium chloride, mmoles | Ammonium Acetate, mmoles | Ferric Chloride, mmoles | Other, As Indicated | | CC. | Mmoles b | Temp., °C. | Time, Hrs. | Conv., percent | Yield, percent |
| 1 | 1.0 | | 8 | | | 12.3 | 10 | 364 | 105 | 0.67 | 57 | 93 |
| 2 | 1.0 | 2 | 8 | 0.1 | | 12.3 | 5 | 153 | 105 | 1.00 | 45 | 90 |
| 3 | 1.0 | 2 | 8 | 0.1 | | 12.3 | 5 | 153 | 115 | 0.67 | 58 | 88 |
| 4 | 1.0 | 8 | 2 | 0.1 | | 12.3 | 4 | 106 | 115 | 0.5 | 80 | 93.5 |
| 5 | 1.0 | 8 | 2 | 0.1 | | 12.3 | 4 | 106 | 115 | 0.5 | 80 | 86 |
| 6 | 2.5 | 8 | | 2 | | 12.3 | 4 | 106 | 115 | 0.5 | 78 | 93 |
| 7 | 1.0 | | | 0.1 | | 12.3 | 4 | 106 | 115 | 0.5 | 41 | 87 |
| 8 | 1.0 | | | 0.1 | | 12.3 | 4 | 106 | 115 | 2.0 | 65 | 79 |
| 9 | 1.0 | | | 0.1 | 2.5 mmoles ammonium formate. | 12.3 | 4 | 106 | 115 | 1.0 | 70 | 84 |
| 10 | 30 | | | 3 | | 190 | 77 | | 115 | 2.0 | 60 | 72 |
| 11 | 1.0 | | | 0.1 | 3 cc. isopropyl ether | 12.3 | 5 | 153 | 115 | 2.0 | 61 | 74 |
| 12 | 1.0 | | | 0.1 | 3 cc. ethyl acetate | 12.3 | 5 | 153 | 115 | 2.0 | 50 | 62 |
| 13 | 1.0 | | | | | 12.3 | 5 | 153 | 115 | 0.5 | 16 | 100 |
| 14 | 1.0 | | | | 1.5 cc. diethyl ether | 12.3 | 5 | 153 | 115 | 1.0 | 24 | 92 |
| 15 | 1.0 | | | | | 12.3 | 5 | 153 | 115 | 1.5 | 38 | 89 |
| 16 | 1.0 | | | | | 12.3 | 5 | 153 | 115 | 2.0 | 51 | 71 |
| 17 | 1.0 | | | | 0.1 mmole aluminum chloride. | 12.3 | 5 | 153 | 115 | 2.0 | 74 | 79 |
| 18 | 100 | 100 | | | | 230 | 100 | 3,000 | 110 | 1.75 | 72 | 76 |
| 19 | 100 | 100 | | 1.0 | | 230 | 100 | 3,000 | 110 | 1.75 | 60 | 65 |
| 20 | 100 | 100 | | 1.0 | | 230 | 100 | 3,000 | 110 | 1.25 | 63 | 73 |
| 21 | 1.0 | | | | | 12.3 | 4.5 | 130 | 110 | 2.5 | 49 | 59 |
| 22 | 1.0 | | | | | 12.3 | 5.0 | 153 | 110 | 3.0 | 53 | 88 |
| 23 | 1.0 | 1.0 | | | | 12.3 | 5.0 | 153 | 110 | 2.0 | 80 | 89 |
| 24 | 100 | 100 | | 1.0 | | 230 | 100 | 3,000 | 110 | 2.5 | 79 | 79 |
| 25 | 100 | 100 | | 1.0 | | 230 | 150 | 4,500 | 110 | 2.5 | 76 | 78 |
| 26 | 100 | 100 | | 1.0 | | 230 | 150 | 4,500 | 110 | 2.5 | 79 | 81 |
| 27 | 100 | 100 | | 5.0 | | 230 | 150 | 4,500 | 110 | 1.75 | 72 | 87 |
| 28 | 100 | 100 | | 5.0 | | 230 | 150 | 4,500 | 110 | 1.75 | 75 | 86 | a Added to 12.3 ml. reactor over a 3 to 5 minute period. Added to the 230 ml. reactor over a 20–40 minute period.
b Calculated mmoles ammonia in liquid phase.

7

The reactor, in each instance containing the amount of p-nitrosophenol shown and other components as indicated, was sealed and evacuated and the requisite amount of gaseous ammonia was added at a rate sufficiently low to control the neutralizaiotn reaction temperature to below a maximum of about 50° C., i.e., to form the ammonium p-nitrosophenolate. After completion of the salt-forming reaction, i.e., the neutralization, the sealed reactor containing ammonia in liquid phase in stoichiometric excess of the ammonium p-nitrosophenolate formed therein, was immersed in an oil bath to maintain the second stage reaction at the temperature-time conditions indicated. These runs demonstrate high conversion and/or yield that can be obtained when operating in accordance with the two-stage process of the invention.

*Example 10*

12.3 grams of p-nitrosophenol was admixed with 5.4 grams ammonium chloride and 50 ml. propionitrile. To this was added 100 ml. liquid ammonia, at room temperature, over a 3-minute period. After an addiitonal 3 to 5 minutes, the temperature of the reactor contents was raised to 115° C. and maintained for 2.5 hours. p-Nitrosoaniline was recovered in an 84 percent conversion in 86 percent yield.

*Example 11*

The general procedure of Example 10 was repeated in each of the Runs A–F, the results of which are tabulated as follows:

|  | A | B | C | D | E | F |
|---|---|---|---|---|---|---|
| p-Nitrosophenol, gms | 0.123 | 0.123 | 0.123 | 0.123 | 0.123 | 0.123 |
| Ammonia, liquid cc.'s | 5.0 | 5.0 | 5.0 | 5.0 | 5.0 | 5.0 |
| Reaction temperature, °C | 115 | 115 | 115 | 115 | 115 | 115 |
| Reaction time, hrs | 4.0 | 4.0 | 2.0 | 2.0 | 2.0 | 2.0 |
| Supplemental solvent, ml.: |  |  |  |  |  |  |
| Acetonitrile | 2.0 |  |  |  |  |  |
| Isobutyronitrile |  | 2.0 |  |  |  |  |
| Isopropyl acetate |  |  | 1.5 |  |  |  |
| Methyl acetate |  |  |  | 2.0 |  |  |
| n-Butyl ether [1] |  |  |  |  | 3.0 |  |
| Diisopropyl ether [1] |  |  |  |  |  | 2.5 |
| Conversion, percent | 89 | 84 | 65 | 60 | 72 | 77 |
| Yield, percent | 93 | 86 | 73 | 74 | 79 | 75 |

[1] Together with 0.1 mmole aluminum chloride.

*Example 7*

The following was charged to an 84 ml. steel reactor at room temperature: 2.48 grams p-nitrosophenol; 8.6 grams ammonium chloride; 3.0 grams ammonium acetate; and 0.3 gram ferric chloride. To the resulting admixture was added 37 ml. of liquid ammonia, at room temperature. No external heating was applied to the reactor. A violent exotherm developed immediately together with charring of the reactor contents, and there was no recognizable survival of p-nitrosophenol nor of formation of ammonium p-nitrosophenolate, or for that matter, p-nitrosoaniline.

*Example 8*

The procedure of Example 7 was repeated except that acetonitrile was utilized as a supplemental solvent. Thus, to a 250 ml. steel reactor was added 6.15 grams p-nitrosophenol; 2.7 grams ammonium chloride; and 32 cc.'s acetonitrile. 100 ml. liquid ammonia was then added to the above mixture at room temperature over a period of from 1.5 to 2.0 minutes. After about 3 minutes, subsequent to the ammonia addition, the free ammonia was vented. The contents of the reactor were found to contain 96 percent ammonium p-nitrosophenolate and 2 percent p-nitrosoaniline.

A charge, and procedure, similar to that immediately above were repeated and after formation of the ammonium p-nitrosophenolate, the reactor contents were heated at 115° for 2.5 hours. A conversion to p-nitrosoaniline of 86 percent, in 88 percent yield, was obtained.

*Example 9*

12.3 grams p-nitrosophenol was admixed with 30 cc.'s of ethyl acetate in a 250 ml. steel reactor. 100 ml. of liquid ammonia was added at room temperature over about a 3-minute period. After an additional 3 to 5 minutes, the ammonia was vented and residual product was found to contain slightly over 96 percent ammonium p-nitrosophenolate and 2 to 3 percent p-nitrosoaniline.

*Example 12*

The general procedure of Example 10 was repeated except under substantially reduced temperature conditions in the second stage reaction. 0.123 gram p-nitrosophenol was admixed with 0.15 gram ammonium acetate and 10 cc.'s liquid ammonia and reacted to form the ammonium p-nitrosophenolate. The resulting admixture was then heated at 80° C. for 13.3 hrs. A conversion of ammonium p-nitrosophenolate to p-nitrosoaniline was 19 percent.

*Example 13*

The general procedure of Example 10 was repeated except that the second stage reaction temperature was 65° C. 0.123 gram p-nitrosophenol was admixed at room temperature with 10 cc.'s of liquid ammonia and 0.154 gram ammonium acetate and reacted to form ammonium p-nitrosophenolate. The resulting admixture was then heated at 65° C. for 4 hours. Conversion to p-nitrosoaniline was 3 percent.

*Example 14*

The general procedure of Example 10 was repeated except that the second stage reaction temperature was 85° C. 0.123 gram p-nitrosophenol was admixed with 10 liquid cc.'s of ammonia, 0.308 gram ammonium acetate and 0.082 gram ferric chloride. The resulting ammonium p-nitrosophenolate-containing reaction mixture was heated at 85° C. for a period of 4 hrs. to obtain a conversion to p-nitrosoaniline of 9 percent.

*Example 15*

The general procedure of Example 10 was repeated to form ammonium p-nitrosophenolate from a mixture of 0.123 gram p-nitrosophenol, 4 liquid cc.'s ammonia, 0.62 gram ammonium acetate, 0.11 gram ammonium chloride, 0.16 gram ferric chloride and 0.22 gram calcium chloride. The resulting ammonium p-nitrosophenol-containing mixture was then heated at 115° C. for 30 minutes to form p-nitrosoaniline at a conversion of 48 percent.

Example 16

The general procedure of Example 10 was repeated to form ammonium p-nitrosophenolate in a mixture of 0.123 gram p-nitrosophenol, 0.11 gram ammonium chloride, 0.08 gram ferric chloride, and 0.38 gram ammonium p-toluene sulfonate. The resulting ammonium p-nitrosophenolate-containing mixture was then heated at 115° C. for one hour to form p-nitrosoaniline at a conversion of 48 percent.

Example 17

1 mmole (0.123 gram) p-nitrosophenol was charged to a 12 ml. reactor, sealed and evacuated and chilled to the temperature of a Dry Ice-acetone slurry. To this there was then distilled in vacuo 5 cc.'s of liquid ammonia measured at room temperature over a 5-minute period. The excess ammonia was then vented from the reactor and the solid ammonium salt of p-nitrosophenol, i.e., ammonium p-nitrosophenolate, was recovered. The salt was then allowed to reconvert to p-nitrosophenol by liberation of the ammonia at atmospheric pressure and room temperature over a period of about 30 minutes to provide residual p-nitrosophenol in 98 percent yield.

This demonstrates reaction of p-nitrosophenol with ammonia at −78° C. to form the ammonium salt in high yield, as manifested by the high recovery of p-nitrosophenol upon allowing the recovered ammonium salt to reconvert to p-nitrosophenol.

The invention is further illustrated with reference to the graphs of FIGS. 1–9 of the drawings.

FIGS. 1–9 each show two graphs, namely, a plot of time vs. each of yield and conversion of p-nitrosophenol to p-nitrosoaniline. Each of the graphs is determined under comparable conditions of temperature, pressure, reactor volume and proportions of p-nitrosophenol, ammonia and any other materials present as shown in the following tabulation. The procedure followed in determination of each of the points on which the graphs are determined was that of Example 6.

FIG. 1 is illustrative of the two-stage process, devoid of solvent and added salt in the system and shows that 240 minutes was required for the conversion to rise to a maximum of about 68 to 70 percent, at a yield in about the same order.

As shown with reference to FIG. 2, the presence of ferric chloride provides a somewhat increased reaction rate, see for example, the conversion at 60 minutes, which is 55 percent as compared to 40 percent of FIG. 1.

FIG. 3 shows that in the presence of a mixture of ammonium acetate and ammonium chloride together with ferric chloride, the highest conversion obtained was 80 percent in 60 minutes at a 87 percent yield. This further demonstrates the effect of the presence of an added salt, which is to increase reaction rate leading high conversion and yield in shorter time.

FIG. 4 demonstrates the reaction of FIG. 3 in which an equivalent of ammonium formate is substituted for ammonium acetate with similar results.

FIG. 5 demonstrates the relationship of temperature to the reaction. Thus, the optimum time at this lower temperature of 110° C. is about 90 minutes whereas at 115° C. of FIG. 4, otherwise based on substantially the same conditions, the optimum time is shortened to about 60 minutes.

The graphs of FIG. 6 are plots of conditions about the same as shown for FIGS. 1 and 2 except for the presence of ethyl acetate as a solvent. As shown, the results are substantially the same as shown for FIG. 1, and to a large extent, FIG. 2, and they demonstrate that ethyl acetate can be used as a diluent for processing, particularly in the first stage, without impairing the time/yield/conversion relationship in the second stage.

The graphs of FIG. 7 show the results of the use of diethyl ether as a diluent, the use of this solvent providing results comparable with those observed when employing ethyl acetate of FIG. 6.

The graphs of FIG. 8 show the use of diethyl ether as a solvent together with aluminum chloride, the rate of reaction being faster than observed when carrying out the reaction in the presence of diethyl ether alone, of FIG. 7. Thus, the conversion of FIG. 8 at the 60-minute point is 68 percent vs. 54 percent at 60 minutes of FIG. 7, which demonstrates that the effect of added salt on the time/yield/conversion relationship is not impaired by the use of the ether as a diluent.

The graphs of FIG. 9 demonstrate that when using salts with a solvent (diethyl ether), the rate is greatly accelerated so that the optimum is reached in 40 to 60 minutes and supplements the showing of FIG. 8, discussed above.

p-Nitrosoaniline product of the invention has especial utility as a precursor in numerous instances. For example, it can be reacted under mild hydrogenation conditions to reduce the nitroso group to form p-phenylene diamine well known for its reactivity in many processes; it can be reacted with itself under conditions for the formation of compounds containing azo linkages having utility in various syntheses, particularly in the manufacture of dyes; and it can be readily oxidized to p-nitroaniline, another well known chemical intermediate.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. A two-stage process for the manufacture of p-nitrosoaniline which comprises, in a first stage, introducing ammonia and p-nitrosophenol in a mole ratio of ammonia to p-nitrosophenol in excess of 1:1 into contact to form a resulting reaction mixture, and maintaining said mixture at a temperature in a range above the melting point of ammonia therein but not in excess of 70° C. for at least one minute, and maintaining ammonia in said mixture in liquid phase during at least a period of said contacting up to and including

TABLE II

| | 1 | 2 | 3 | 4 | 5 | 6 | 7 | 8 | 9 |
|---|---|---|---|---|---|---|---|---|---|
| p-Nitrosophenol, grams | 0.123 | 0.123 | 0.123 | 0.123 | 0.123 | 0.123 | 0.123 | 0.123 | 0.123 |
| Ammonia, liquid cc.'s | 5 | 4 | 4 | 4 | 4 | 5 | 5 | 5 | 5 |
| Solvent, liquid cc.'s | | | | | | EtOAc, 1.5 | Diethyl ether, 1.5 | Diethyl ether, 1.5 | Diethyl ether, 1.5 |
| Salt, grams | | FeCl$_3$, 0.016 | NH$_4$Cl, 0.11, NH$_4$OAc, 0.62, FeCl$_3$, 0.016 | NH$_4$Cl, 0.11, FeCl$_2$, 0.016, NH$_4$ Formate, 0.51 | NH$_4$OAc, 0.62, NH$_4$Cl, 0.11, FeCl$_3$, 0.016 | | AlCl$_3$, 0.1 mmole | | AlCl$_3$, 0.1 mmole, NH$_4$OAc, 0.77, NH$_4$Cl, 0.11 |
| Temperature, °C | 115 | 115 | 115 | 115 | 110 | 115 | 115 | 115 | 115 |
| Pressure | Sufficient to maintain ammonia as liquid | | | | | | | | | termination of same, whereby said ammonia and said n-nitrosophenol react exothermically to form ammonium p-nitrosophenolate dissolved in said liquid ammonia phase; introducing at least one of said ammonia and p-nitrosophenol into the above said contact to form said admixture at a sufficiently low rate to permit dissipation of heat from the resulting exothermic reaction so as to maintain said temperature within said range; in a second stage, heating resulting ammonia phase, in its liquid state, at a temperature within the range of from 90° to 125° C. for at least 0.25 hr., whereby p-nitrosophenolate in said liquid ammonia phase reacts to form p-nitrosoaniline; and recovering p-nitrosoaniline, so produced, as product of the process.

2. A process of claim 1 where at least one salt selected from the group consisting of calcium chloride, aluminum chloride, ferric chloride, ammonium acetate, ammonium formate, ammonium p-toluene sulfonate and ammonium chloride is present in said liquid phase during heating thereof in the said second process stage.

3. A process of claim 1 wherein at least one organic solvent selected from the group consisting of lower alkyl acetic acid esters, lower alkyl nitriles and diethyl ether, is present in said liquid phase during heating thereof in said second process stage.

4. In the process of claim 1, in the said first stage, introducing said ammonia as a gas into contact with said p-nitrosophenol as a solid at said rate until about one equivalent of ammonia is added per equivalent of p-nitrosophenol, and adding a final portion of the remainder of said ammonia to be added, as a liquid.

5. In a process of claim 1, introducing solid p-nitrosophenol at said rate into contact with said ammonia as a liquid.

6. In a process of claim 1, in the first stage, introducing into said admixture an organic solvent selected from the group consisting of lower alkyl nitriles, lower alkyl acetic acid esters and diethyl ether, and retaining said organic solvent in said liquid phase during said heating thereof in said second stage.

7. In a process of claim 1, in the first stage, introducing into said admixture a salt selected from the group consisting of aluminum chloride, calcium chloride, ferric chloride, ammonium acetate, ammonium formate, ammonium p-toluene sulfonate and ammonium chloride, whereby said salt is dissolved in said liquid phase, and retaining said salt in said liquid phase during heating thereof in said second stage.

8. In a process of claim 1, in the first stage, admixing all of the said p-nitrosophenol with a hydrocarbon liquid to form a resulting hydrocarbon slurry of said p-nitrosophenol, and passing about one equivalent of gaseous ammonia into said slurry at said rate and adding a remaining portion of said ammonia, to said slurry, as a liquid, whereby separate liquid ammonia and hydrocarbon phases are formed; and separating said phases to provide said ammonia phase for heating in said second stage as described.

9. A process of claim 2 wherein said salt in said liquid phase is present in a mole ratio to the p-nitrosophenol, introduced into the said admixture in said first stage, of from 0.01:1 to 10:1.

10. A process of claim 6 wherein said solvent is introduced into said admixture in said first stage in an amount to contain ammonium p-nitrosophenolate, formed therein, in a concentration of from 0.5 to 1.0 molar.

11. A process of claim 1 wherein the mole ratio of ammonia to said p-nitrosophenol, introduced into said admixture, is at least 2:1.

12. A process of claim 11 wherein the mole ratio of ammonia to p-nitrosophenol, introduced into said admixture, is in the range of from 50:1 to 300:1.

13. A process of claim 12 wherein the temperature of said liquid phase during said heating of same in said second stage is in the range of from 105 to 120° C. for a period of from 0.25 to 6 hours.

14. A process of claim 1 wherein the temperature of said admixture in said first stage is maintained within the limits of 0 to 50° C.

15. A process of claim 6 wherein the mole ratio of ammonia to p-nitrosophenol, introduced into said admixture, in said first stage, is from 10:1 to 50:1 and the amount of said solvent present in said admixture is sufficient to contain p-nitrosophenolate formed therein in a concentration of from 0.1 to 0.5 molar.

16. A process of claim 6 wherein said organic solvent is introduced into said admixture in the first stage in an amount to form a resulting solution containing ammonium p-nitrosophenolate formed therein in a concentration of from 0.5 to 1.0 molar; a salt selected from the group consisting of calcium chloride, aluminum chloride, ferric chloride, ammonium acetate, ammonium formate, ammonium p-toluene sulfonate and ammonium chloride is introduced into said admixture in the first stage in a mole ratio to p-nitrosophenol added thereto within the range of from 0.01 to 10:1; ammonia is introduced into said admixture in a mole ratio to p-nitrosophenol added thereto of from 10:1 to 50:1; the temperature of said admixture in said first stage is maintained from 0 to 35° C.; all unreacted ammonia and said salt are retained with said solvent in the said liquid ammonia phase; and the said liquid phase is heated during said second stage at a temperature of from 105 to 120° C. for from 0.25 to 6 hours.

17. A process of claim 1 wherein the said liquid phase is heated in said second stage for a period of from 0.25 to 10 hours.

18. A process of claim 3 wherein said organic solvent is a lower alkyl nitrile.

No references cited.

CHARLES B. PARKER, *Primary Examiner.*

JOSEPH P. BRUST, *Examiner.*

R. V. HINES, *Assistant Examiner.*

UNITED STATES PATENT OFFICE
CERTIFICATE OF CORRECTION

Patent No. 3,338,966                  August 29, 1967

John C. Snyder

It is hereby certified that error appears in the above numbered patent requiring correction and that the said Letters Patent should read as corrected below.

Column 6, line 12, for "was liquid to two phase" read -- was liquid in two phases --; columns 9 and 10, TABLE II, Example "4", line 6 thereof, for "$FeCl_2$," read -- $FeCl_3$, --; column 11, lines 1 and 2, for "n-nitrosophenol" read -- p-nitrosophenol --.

Signed and sealed this 1st day of October 1968.

(SEAL)
Attest:

Edward M. Fletcher, Jr.             EDWARD J. BRENNER
Attesting Officer                 Commissioner of Patents